United States Patent
Lichtensteiger et al.

(10) Patent No.: US 11,938,552 B2
(45) Date of Patent: Mar. 26, 2024

(54) BLANK HOLDER AND BLANK

(71) Applicant: Ivoclar Vivadent AG, Schaan (LI)

(72) Inventors: Markus Lichtensteiger, Montlingen (CH); Sven Hellmich, Forst (DE)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 18/056,306

(22) Filed: Nov. 17, 2022

(65) Prior Publication Data
US 2023/0158584 A1 May 25, 2023

(30) Foreign Application Priority Data

Nov. 25, 2021 (EP) ..................... 21210619

(51) Int. Cl.
| | |
|---|---|
| *B23Q 3/00* | (2006.01) |
| *A61C 13/00* | (2006.01) |
| *B23C 3/16* | (2006.01) |
| *B23C 9/00* | (2006.01) |
| *B23Q 3/06* | (2006.01) |

(52) U.S. Cl.
CPC ............ *B23C 9/00* (2013.01); *A61C 13/0022* (2013.01); *B23C 3/16* (2013.01); *B23Q 3/062* (2013.01); *B23C 2240/21* (2013.01)

(58) Field of Classification Search
CPC .......... B23Q 3/062; B23Q 3/067; B23Q 3/00; A61C 1/00; A61C 13/0006; B23C 3/35
See application file for complete search history.

(56) References Cited

U.S. PATENT DOCUMENTS

| | | | | |
|---|---|---|---|---|
| 4,519,733 | A | * | 5/1985 | Gregg .................... B23Q 7/043 198/346.2 |
| 7,077,391 | B2 | | 7/2006 | Filser et al. |
| 7,604,759 | B2 | | 10/2009 | Gubler et al. |
| 9,675,433 | B2 | * | 6/2017 | Cornell .................... B23Q 3/06 |
| 10,500,686 | B2 | * | 12/2019 | Schüle ................... B23Q 3/062 |
| 2004/0072121 | A1 | | 4/2004 | Filser et al. |
| 2011/0280692 | A1 | * | 11/2011 | Evertz .................... B23Q 7/047 409/161 |
| 2022/0142756 | A1 | * | 5/2022 | Lichtensteiger ....... A61C 13/34 |
| 2022/0192802 | A1 | * | 6/2022 | Steger ................ A61C 13/0006 |
| 2023/0083917 | A1 | * | 3/2023 | Habit ..................... A61C 13/12 |
| 2023/0158584 | A1 | * | 5/2023 | Lichtensteiger ... A61C 13/0022 29/559 |

FOREIGN PATENT DOCUMENTS

| | | |
|---|---|---|
| FR | 3089782 A1 | 6/2020 |
| WO | 2011029615 A1 | 3/2011 |

* cited by examiner

*Primary Examiner* — Lee D Wilson
(74) *Attorney, Agent, or Firm* — Ann M. Knab; Thad McMurray

(57) ABSTRACT

A blank holder and a blank are provided, the blank holder having a receiving area for a substantially disc-shaped blank, the receiving area being curved. The receiving area forms a straight, circular or part-circular or arc-shaped form-fitting profile. The blank has a matching guide shell which can be inserted or turned into the form-fitting profile.

17 Claims, 4 Drawing Sheets

BLANK HOLDER AND BLANK

CROSS-REFERENCE TO RELATED APPLICATIONS

This application claims priority to European Patent Application No. 21210619.9 filed on Nov. 25, 2021, the disclosure of which is incorporated herein by reference in its entirety.

TECHNICAL FIELD

The invention relates to a blank holder and blank, and to a method of mounting a blank on a blank holder.

BACKGROUND

It has long been known how to produce blanks for dental restoration parts in disc form and to machine these blanks by chip removal, i.e. subtraction, and to produce the dental restoration parts. Often, such blanks have such a size that a plurality of teeth can be produced from one blank.

Machining is usually carried out in a milling machine. A blank holder is firmly connected to the milling machine, which in turn has a receiving area for the blank.

The blank is clamped there. For form-fit mounting, the blank holder must engage over a part of the blank. This part on the outer edge of the blank cannot be used for the production of dental restoration parts. Also, the material used for the blank is comparatively expensive.

In order to obtain improved utilization of the material, the provision of a protruding circumferential edge on the blank, a so-called Xavex edge, has become known. The blank is clamped at this edge in the receiving area. It is about one third of the height of the blank, so that less material is used, thus saving material. U.S. Pat. No. 7,604,759 is directed to a blank having a clamping groove and hereby incorporated by reference in its entirety.

It has also become known not to produce this circumferential edge from the material of the blank, but for example from inexpensive plastic and to attach the plastic edge to the blank in a suitable way, for example by gluing. In this way, the blank material can be fully utilized.

The plastic material is usually less pressure resistant than the blank material, especially if the blank is made of ceramic. For safe and precise storage, the plastic edge is therefore usually clamped tightly.

The provision of an adapter which fixes the plastic edge, for example by means of clamping screws, and which is itself mounted in the milling machine's receiving area, is also known.

Such a solution is known from WO 02/45 614 A1 and corresponding US 2004072121A1 and U.S. Pat. No. 7,077, 391, which US published application and patent are hereby incorporated by reference in their entirety.

The solution requires the adapter to be removed from the milling machine and the four clamping screws to be loosened in order to change the blank. Then the used blank must be removed and a new one inserted. The four clamping screws must be reinserted and tightened and the adapter together with the blank must be clamped in the milling machine. All in all, this solution is therefore quite time-consuming, so it is not surprising that it has not become established.

SUMMARY

In contrast, the invention is based on the task of procuring a blank holder and blank according to the claims as well as a method according to the claims, which offers an improved workflow despite high repeatability and precision when milling dental restoration parts.

According to the invention, the blank has a guide shell on its outer edge. The guide shell extends over part of the outer edge of the blank, for example over a quarter of the outer edge.

It is particularly favorable for the blank holder to have a form-fitting profile with its receiving area. Such a profile typically has an undercut. With such a profile, the blank can be clamped to its guide shell, even if this is only provided on one side of the blank.

For example, the form-fitting profile can engage over the guide shell for secure storage. The form-fitting profile is preferably made of a single piece.

The connection between the form-fitting profile and the guide shell is designed in such a way that a relative movement is possible in one—translatory or rotatory—spatial direction. In the other two spatial directions, however, the connection is fixed, i.e., it does not allow any movement of the form-fitting profile and the guide shell relative to each other.

In the spatial direction that enables the movement, there is preferably a clearance-free bearing.

In the two other spatial directions, there are stops and undercuts, respectively, that ensure the desired fixation.

Preferably, this three-dimensional combination bearing is also moment-stable in the two other spatial directions, i.e., it is also capable of absorbing shear forces.

According to the invention, one side of the blank is mounted to the blank holder. The blank is therefore not supported all around, but only on one of its sides. In the case of angular blanks, the support can be provided on one of the side surfaces, and in the case of round blanks, it can be provided via an arc or partial circle which extends over less, preferably over considerably less than 180 degrees.

The absorption of shear forces and the support against them is particularly important in the case of the one-sided bearing. According to the invention, this is achieved by the form-fitting profile engaging behind or over the guide shell, preferably at two points spaced apart from each other.

In a disc-shaped blank, the disc axis extends through the center of the disc. The spaced points are then distant from each other when viewed parallel to the disc axis.

Viewed according to the laws of leverage, the load arm then extends between the points, and the load arm perpendicular to it, corresponding to the distance between the cutter and the connecting line between the locations or points.

From this consideration it follows that the connecting line between the points should be as long as possible to ensure good support.

According to the invention, the blank is supported on the receiving area in a very simple manner: The blank is turned or pushed into the form-fitting profile with its guide shell without further ado. The relative movement takes place in the longitudinal direction of the profile and thus along the outer edge of the disc-shaped blank. The guide shell and the form-fitting profile have a matching cross-section. In a bearing position, the guide shell fills the receiving area.

If the blank has a round disc shape, the guide shell extends in an arc along its outer edge, over one tenth to ¾ of the outer edge, for example over ⅜. The form-fitting profile also extends in an arc over a partial circle, which still makes it possible to align the guide shell with the blank in such a way that it is aligned with an entrance to the form-fitting profile, so that it is possible to turn the guide shell into the form-fitting profile. In this solution, the sum of the angular extension of the form-fitting profile and the guide shell is less than 360 degrees in order to allow the insertion at the entrance. The guide shell of the blank is turned into the form-fitting profile until the bearing position is reached.

The diameter of the round disc-shaped blank can be e.g. 95 mm to 102 mm, with a height between 10 mm and 35 mm.

The term "turning in" is used here to describe a relative rotational movement of the guide shell and the form-fitting profile, which begins when the guide shell is placed at the entrance to the form-fitting profile and ends when the bearing position is reached.

If the blank has a polygonal, e.g. rectangular or square disc shape, the guide shell and the form-fitting profile each extend straight. The guide shell is attached to a side surface, i.e. the edge, of the disc-shaped blank. In the case of a rectangular disc shape, this is preferably a longitudinal side and thus not an end side. The form-fitting profile extends over essentially the same length as the guide shell, although a considerable deviation in length, e.g. 50%, is also possible. The guide shell is aligned with an entrance of the form-fitting profile and the guide shell of the blank is inserted into the form-fitting profile until the bearing position is reached.

Preferably, the guide shell is made of plastic and attached to the blank, e.g. by gluing. It projects above and below the blank disc. The areas of the guide shell that project upwards and downwards each form an undercut. These areas are engaged over by the form-fitting profile and ensure a stable and secure mounting of the blank disc on the receiving area. In this way, the guide shell is mounted in the form-fitting profile in a form-fitting manner and without play. The profile cross-section of the form-fitting profile is e.g. C-shaped with end shanks pointing towards each other, which engage over the said areas or projections of the guide shell.

In an alternative embodiment, a kinematic interchange is provided in this respect. In this case, the guide shell of the blank engages over the form-fitting profile of the blank holder.

The blank can be made of ceramic, e.g. zirconium dioxide, but also of composite or plastic such as PMMA. In the latter case, the guide shell can also be formed in one piece with the rest of the blank.

The form-fitting profile is attached to a workpiece arm of a milling machine. It is in one piece. Its cross-section is constant over the longitudinal extent of the profile, apart from any lead-in chamfers which may be provided on the profile and/or on the guide shell.

In an advantageous embodiment of the invention, it is provided that the disc-shaped blank has a radially outwardly projecting edge covering its height center, against which the guide shell is supported.

In a further advantageous embodiment of the invention, provision is made for the blank holder to be constructed in two or more parts and for the machine mount to be separable from the receiving area with the form-fitting profile and fixable thereto, in particular in a latching manner, wherein in particular the machine mount has a metallic structure and the receiving area for receiving the guide shell is made of plastic such as PPA or PEI.

In an advantageous embodiment of the invention, provision is made for the blank holder to be made of plastic such as PPA, in particular of fiber-reinforced plastic, particularly preferable of PEI, and to be receivable at or in a milling machine together with the blank as a prefabricated unit.

In an advantageous embodiment of the invention, provision is made for the blank to be made of plastic, in particular PMMA, and for the guide shell to be formed integrally with the blank.

In an advantageous embodiment of the invention, provision is made for the blank to bear 2 mutually opposite guide shells and for a second blank holder to be mounted or mountable on the blank opposite the blank holder, which second blank holder can be gripped by a workpiece arm of a milling machine for the purpose of changing workpieces.

According to the invention, a method for mounting a blank on a blank holder is also provided. This is characterized by the fact that a guide shell is attached, in particular glued, to the outer circumference of the blank prior to assembly. In this method, the blank with the guide shell is turned into a form-fitting profile of a receiving area of the blank holder or pushed in the longitudinal direction of the form-fitting profile. This happens until the blank with the guide shell snaps into a stop in a latching position and is fixed.

By fixing the blank in the latching position which is achieved in this manner, its position in space—in relation to the blank holder—is known. A blank, of which e.g. only one part is milled out, can be removed if necessary and replaced by another one, e.g. made of a different material.

If necessary, the first blank can then be reinserted and placed in the latching position. Then another dental restoration part can be milled out in a different place than the tooth.

In this solution, it is preferable to attach an identification code, e.g. a QR code, to the blank so that its data can be stored in the milling machine via a corresponding sensor.

If the blank holder has a machine mount with a bearing plate and a bearing journal projecting therefrom on its side opposite the blank, it can be suitable with its machine mount for automatic loading of a workpiece arm of a milling machine.

It is preferred that the blank holder and blank combination include a blank holder and a disc-shaped or substantially disc-shaped blank, wherein the blank holder comprises a receiving area for the disc-shaped or substantially disc-shaped blank, the receiving area being curved, wherein the receiving area forms a part-circular or arc-shaped form-fitting profile, and wherein the disc-shaped or substantially disc-shaped blank comprises a part-circular guide shell which can be fitted into the form-fitting profile.

It is preferred that the form-fitting profile and the guide shell are rotationally symmetrical.

It is preferred that a blank holder and blank combination includes a blank holder and a polygonal-shaped blank, wherein the blank holder comprises a receiving area for the blank, wherein the receiving area forms an at least partially straight form-fitting profile, and wherein the blank has an at least partially straight guide shell which can be pushed into the form-fitting profile, in the longitudinal direction of the form-fitting profile, and which can be engaged. It is preferred that the polygonal shape is rectangular or square.

It is preferred that the form-fitting profile supports the guide shell without play or movement.

It is preferred that the form-fitting profile is made of a single piece and/or engages over the guide shell.

It is preferred that the form-fitting profile is C-shaped in cross-section and has end sections pointing towards each other, which engage behind and/or over the guide shell or a part of the guide shell.

It is preferred that the guide shell is fixed on the blank and extends circularly or part-circularly along the circumference of the blank, or straight along a straight side surface of the blank.

It is preferred that the form-fitting profile and the guide shell are configured to engage with each other when turned or pushed together.

It is preferred that the form-fitting profile has at least one latching lug pointing towards the guide shell, which latching lug cooperates with at least one latching recess of the guide shell, and wherein the at least one latching lug is prestressed radially inwards, or wherein the guide shell has at least one latching lug which is directed towards the form-fitting profile and interacts with at least one latching recess of the form-fitting profile, and wherein the at least one latching lug is prestressed towards the form-fitting profile.

It is preferred that the at least one latching lug comprises two latching lugs spaced apart from one another in the circumferential direction and act in opposite directions of rotation of the blank.

It is preferred that the blank with the guide shell can be detached from the form-fitting profile by turning or by pushing in the longitudinal direction of the form-fitting profile, by overcoming a latching force.

It is preferred that the form-fitting profile has a release device with which the at least one latching lug can be disengaged from the at least one latching recess.

It is preferred that the guide shell and/or the form-fitting profile have at least one lead-in chamfer on surfaces facing one another.

It is preferred that the guide shell extends over more than 15% of the circumference and less than 100% of the circumference of the blank, preferably over less than 50% of the circumference of the blank and more preferably over 20% to 30% of the circumference of the blank.

It is preferred that the blank holder has, on a side opposite the blank, a machine mount with a bearing plate and a bearing journal projecting therefrom, said machine mount being designed for the automatic loading of a workpiece arm of a milling machine.

It is preferred that the method for mounting a blank on a blank holder includes the steps of fixing a guide shell to an outer circumference of the blank before mounting, turning the blank with the guide shell into a form-fitting profile of a receiving area of the blank holder or pushing the blank in the longitudinal direction of the form-fitting profile until the blank with the guide shell engages and is fixed in a latching position against a stop.

It is preferred that the guide shell is fixed by gluing.

BRIEF DESCRIPTION OF THE DRAWINGS

Further advantages, details and features of the invention will be apparent from the following description of the invention with reference to the drawing, in which.

DETAILED DESCRIPTION

Figure 1:
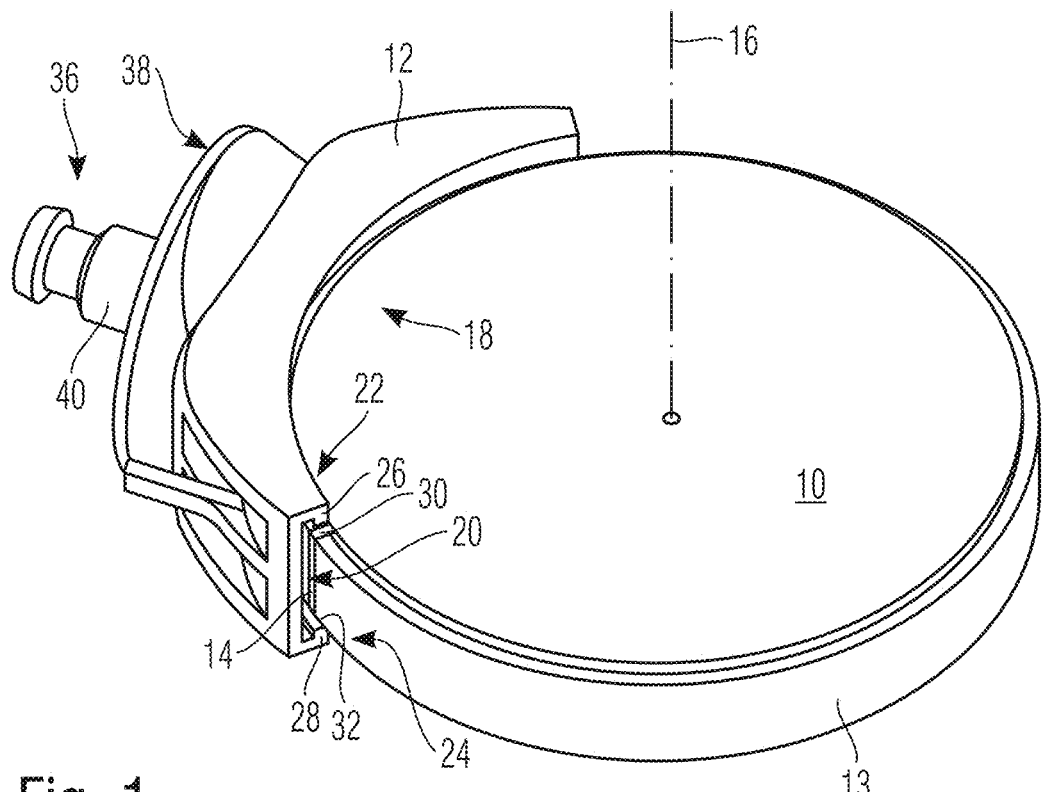
FIG. 1 shows a schematic perspective illustration of an embodiment of a blank according to the invention and of the blank holder according to the invention in the latching position.

The embodiment shown in FIG. 1 shows a blank 10 and a blank holder 12 which are firmly mounted and connected to each other.

The blank is disc-shaped and in this embodiment circular and has a protruding edge 13.

The blank has a guide shell 14 on its outer circumference. The guide shell 14 is glued to the edge 13 or attached thereto in any other manner.

A disc axis 16 extends through the disc-shaped blank perpendicular to the main direction of extension of the blank.

Viewed parallel to the disc axis 16, the guide shell 14 extends beyond the blank 10. In the illustration according to FIG. 1, the guide shell 14 thus projects upwards and downwards.

With the blank having a diameter of about 10 cm, the protrusion or protruding edge 13 is a few millimeters, e.g. 1 to 5 mm.

The guide shell can also be a few millimeters thick, e.g. 1 mm to 5 mm.

For receiving the blank 10, the blank holder 12 has a receiving area 18.

A form-fitting profile 20 is formed at this receiving area. This is such that the guide shell 14 of the blank 10 fits exactly into it. The form-fitting profile 20 engages over the guide shell 14 at two spaced-apart points 22 and 24.

The form-fitting profile 20 is C-shaped or substantially C-shaped. It has end sections 26 and 28. The end sections 26 and 28 engage over the guide shell 14, extending over projections 30 and 32 where the guide shell 14 ends when viewed parallel to the disc axis 16. In this respect, the form-fitting profile 20 engages over the projections 30 and 32.

The dimensions of the guide shell 14 and the form-fitting profile 20 are matched to each other. In this way, the form-fitting profile 20 supports the guide shell 14 with no play or movement.

On the side opposite the form-fitting profile 20, the blank holder 12 has a machine mount 36. This consists of a bearing plate 38 and a bearing journal 40 projecting from it. A machine holder 36 of this type is known per se and is designed to be gripped and accommodated by the workpiece arm of a milling machine.

Figure 2:
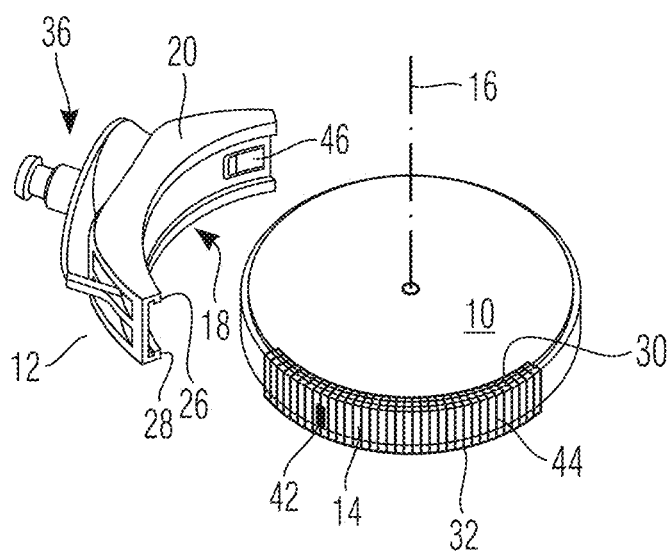
FIG. 2 shows the embodiment according to FIG. 1 in a separated arrangement of blank and blank holder.

FIG. 2 shows how the inside of the form-fitting profile 20 is structured. As is usual with profiles, the form-fitting profile has a constant cross-section along its course. In the exemplary embodiment considered, this is C-shaped, but it can also have any other suitable shape which is capable of engaging over the guide shell 14 of the blank 10.

According to FIG. 2, the blank 10 is still separate from the blank holder 12. It can be seen that the guide shell with the projections 30 and 32 protrudes beyond the blank parallel to the disc axis 16 in its extension, in both directions, i.e. upwards and downwards as viewed in FIG. 2.

The guide shell 14 is glued to the blank 10. It is made of plastic. The guide shell 14 can also be injection-molded, shrink-fitted or welded onto the blank 10 instead.

When viewed parallel to the disc axis 16, the guide shell 14 extends along the edge 13. The edge 13 leaves corners free at the top and bottom where the blank 10 effectively recedes. The material of the guide shell 14 also extends into these corners, resulting in a form fit between the guide shell 14 and the blank 10 in addition to the material fit.

The guide shell 14 extends along a 90° angle on the outer circumference of the blank. This extension angle can also be considerably less, for example only 20 or 30 degrees. It can be up to 270 degrees if the form-fitting profile 20 extends over 90°.

According to the invention, the sum of the extension angles of the form-fitting profile 20 and the guide shell 14 must not exceed 360°. The reason for this is that the blank must be inserted into the form-fitting profile at a point that is free of the guide shell. Only then can the guide shell be turned into the form-fitting profile.

FIG. 2 also shows latching recesses 42 and 44. These are formed on the guide shell 14 to match the latching lugs on the blank holder 12, of which a latching lug 46 can be seen in FIG. 2.

Figure 3:
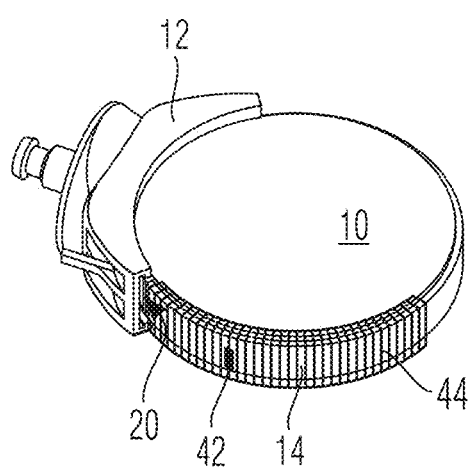
FIG. 3 shows the arrangement of the blank and the blank holder in the attached state, in which a guide shell of the blank is flush with the blank holder.

The condition of the blank inserted into the form-fitting profile can be seen in FIG. 3. In this position, the form-fitting profile 20 is aligned with the guide shell 14.

Figure 4:
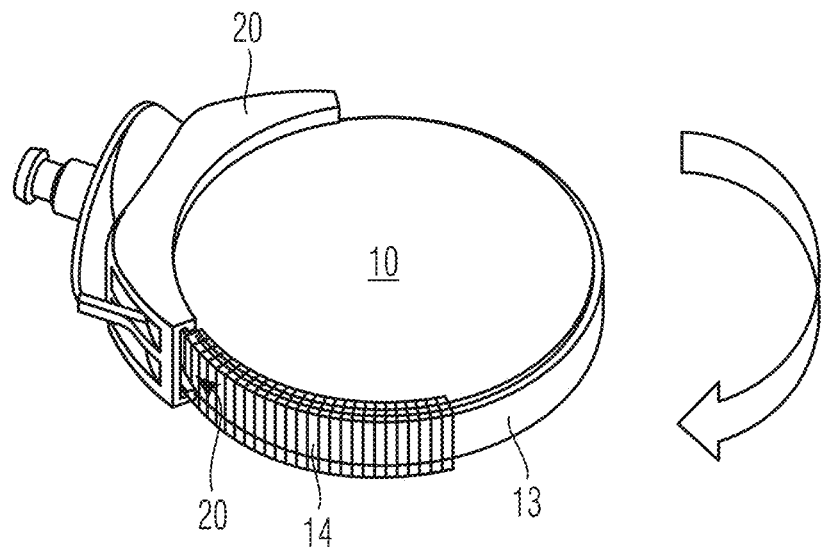
FIG. 4 shows the insertion of the guide shell of the blank into the form-fitting profile of the blank holder by turning them relative to each other.

By turning in the direction indicated in FIG. 4, the blank with its guide shell can be turned into the form-fitting profile and thus into the blank holder.

Figure 5:
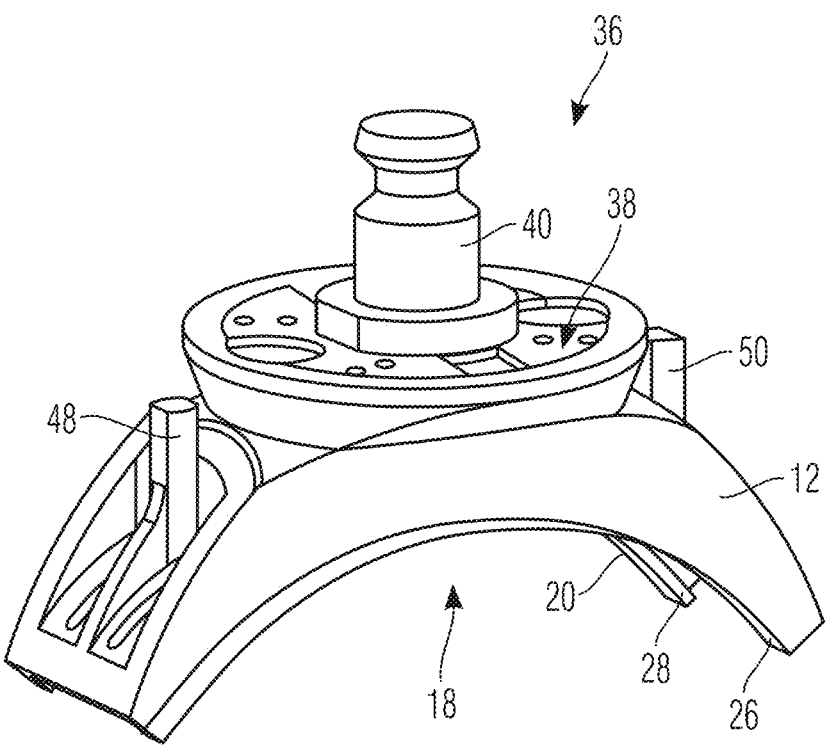
FIG. 5 shows the blank holder as seen from another perspective, showing release devices, each of which can be used to disengage a latching lug of the blank holder from latching recesses of the blank.

FIG. 5 shows the blank holder 12 from the rear. Two release devices 48 and 50 can be seen, which are firmly connected to the latching lugs 46 and movable with the blank holder via a bearing tongue 38.

The bearing tongues 52 press the latching lugs 46 in the direction of the guide shell 14. When the rotational position is reached in which the latching recess 42 is aligned with the latching lug 46, the bearing tongue presses the latching lug 46 into the latching recess 42.

By manually operating the release devices 48 and 50, the latching lugs 46 can be retracted.

As a result, they are disengaged from the latching recesses 42 and 44. In this state, the blank can be rotated and unscrewed from the form-fitting profile 20 so that the blank can be removed.

Figure 6:
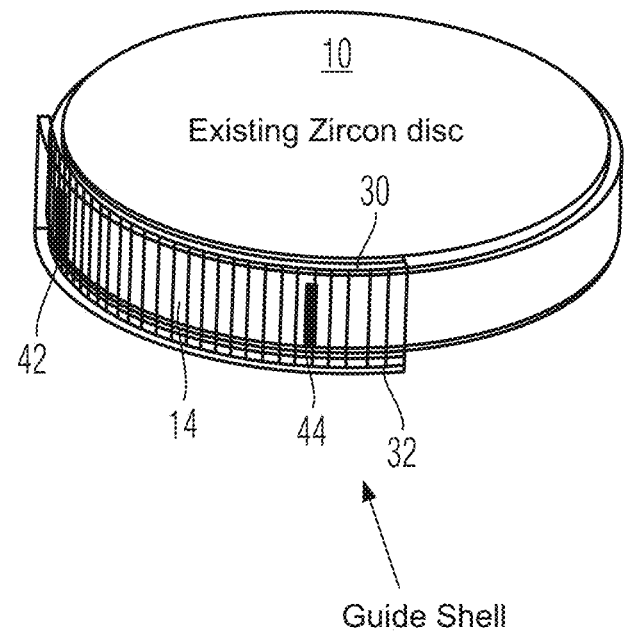
FIG. 6 shows the blank with the guide shell, showing the latching recesses, shortly after the guide shell has been glued to the outer circumference of the blank.

FIG. 6 shows an enlarged view of the blank 10. A blank of a different size or material than the blank described above may also be used. The only important thing is that the guide shell 14 attached to the blank has a shape that matches the form-fitting profile 20.

Figure 7:
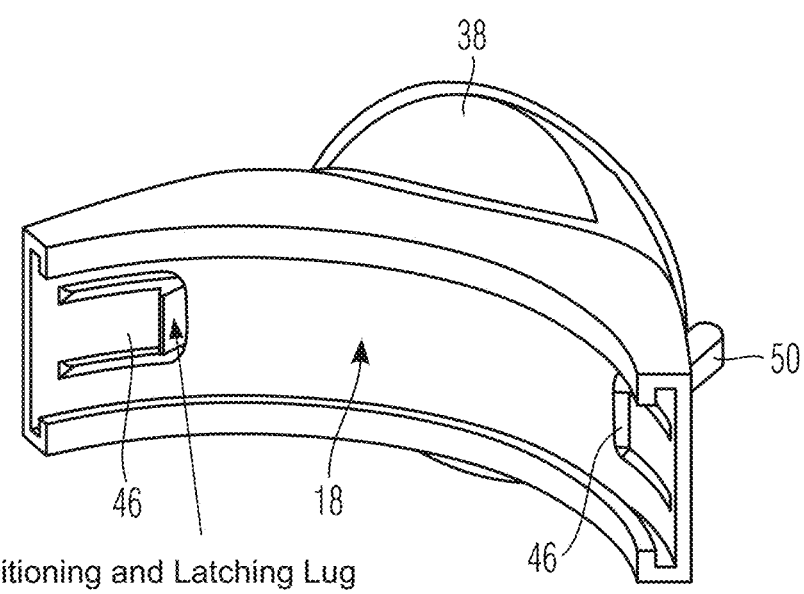
FIG. 7 shows an arc-shaped form-fitting profile of the blank holder from the radially inner side, showing the latching lugs.

In FIG. 7, the blank holder 12 is shown enlarged, showing both latching lugs 46 which can engage in the latching recesses 42 and 44 shown in FIG. 6.

Figure 8:
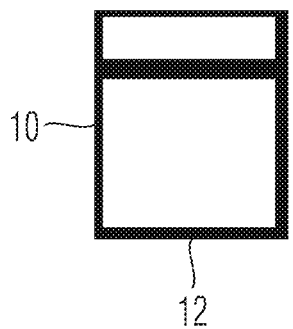
FIG. 8 shows a schematic illustration of another embodiment of the invention, using an angular blank and an angular form-fitting profile.

FIG. 8 shows a modified embodiment of the invention. Both the blank 10 and the blank holder 12 are straight rather than curved or circular. In this embodiment, the guide shell 14 is also straight, as is the form-fitting profile 20. Even with the blank 10 having such a shape with a straight side surface, the blank 10 is preferably flat—and in this respect disc-shaped—and has corners and edges.

An example of such a shape is a flat cuboid, i.e. a cuboid whose height is less than its width and depth.

Figure 10:
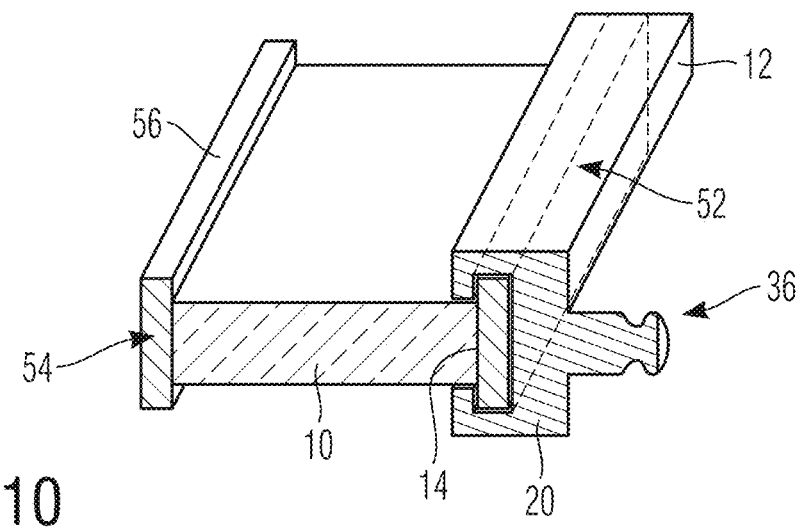
FIG. 10 shows a schematic illustration of another embodiment of the invention, using a square blank and a straight form-fitting profile with two opposing guide shells of the blank.
Figure 11:
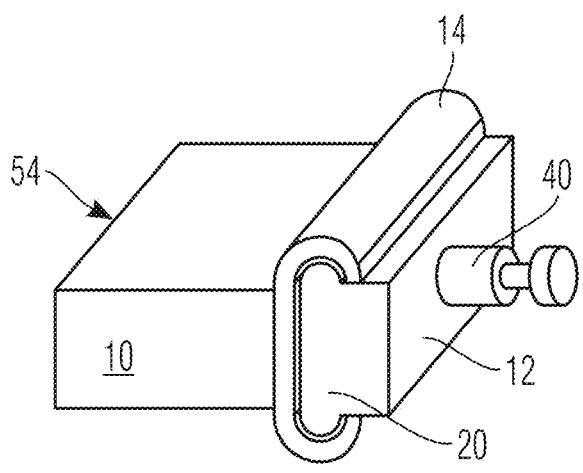
FIG. 11 shows another embodiment of the guide shell and form-fitting profile, in which the guide shell engages over the form-fitting profile.

Further embodiments of such a configuration of the invention can be seen in FIG. 10 and FIG. 11.

Figure 9:
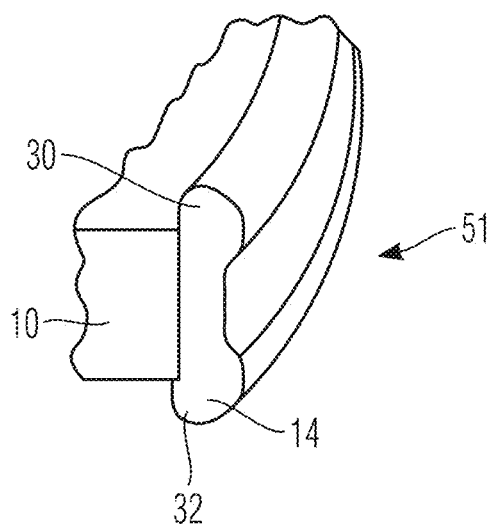
FIG. 9 shows a schematic perspective view of another form of guide shell.

FIG. 9 shows another embodiment of the guide shell 14 according to the invention and, indirectly, of the form-fitting profile according to the invention. The guide shell extends with a rounded and wavy outer side 51.

The form-fitting profile extends to match the cross-section of the guide shell 14, i.e. in the same shape, as a negative image.

This also applies to the embodiment according to FIG. 9.

In the embodiment according to FIG. 10, a straight guide shell 14 is provided, which is guided in a straight form-fitting profile 20. The guide shell 14 is also fastened suitably to the blank 10 in this case. It may be inserted into the form-fitting profile 20 by a translatory movement, a straight movement.

In the embodiment shown, the guide shell 14 is glued to a side surface 52 of the blank 10. Another guide shell 56 is attached, for example glued, to an opposite side surface 54. This can be gripped, for example, by a workpiece changing arm, or can be pushed directly into a form-fitting profile of a further blank holder.

Viewed together, all side surfaces of this essentially disc-shaped blank form the outer circumference of the blank 10.

In this respect, the guide shell 14 is always attached to the outer circumference of the blank 10.

FIG. 11 shows a further embodiment of a combination of blank 10 and blank holder 12 according to the invention. In this embodiment, the guide shell 14 of the blank 10 engages over the form-fitting profile 20 of the blank holder 12.

Here, too, the form-fitting profile 20 and the guide shell 14 are designed to match each other in terms of shape, and a clearance-free mounting is realized. In this embodiment, a straight design is provided. It is understood that alternatively, an arc-shaped design is also possible without leaving the scope of the invention.

In another embodiment, not shown, a combination of straight and curved side surfaces is provided according to the invention. An example of this is a disc which forms a semicircle in plan view. In such a blank, the guide shell 14 may be attached to either a straight or a curved side surface, and therefore have either a straight or a curved shape. The associated form-fitting profile 20 of the blank holder 12 has a matching shape in each case, i.e. it is straight in the case of a straight guide shell 14 and curved in the case of a curved guide shell 14.

The terms "about" and "substantially" are intended to include the degree of error or uncertainty associated with measurement of the particular quantity or shape as one of ordinary skill in the art would understand.

The invention claimed is:

1. A blank holder and blank combination comprising
a blank holder, and
a disc-shaped or substantially disc-shaped blank,
wherein the blank holder comprises a receiving area for the disc-shaped or substantially disc-shaped blank, the receiving area being curved, wherein the receiving area forms a part-circular or arc-shaped form-fitting profile, and wherein the disc-shaped or substantially disc-shaped blank comprises a part-circular guide shell that is attached to an outer circumference of the blank and which can be fitted into the form-fitting profile.

2. The blank holder and blank combination according to claim 1, wherein the form-fitting profile and the guide shell are rotationally symmetrical.

3. The blank holder and blank according to claim 1, wherein the form-fitting profile supports the guide shell without play.

4. The blank holder and blank according to claim 1, wherein the form-fitting profile is made of a single piece and engages over the guide shell.

5. The blank holder and blank according to claim 1, wherein the form-fitting profile is C-shaped in cross-section and has end sections pointing towards each other, which engage behind and over the guide shell or a part of the guide shell.

6. The blank holder and blank according to claim 1, wherein the guide shell is fixed on the blank and extends circularly or part-circularly along the circumference of the blank, or straight along a straight side surface of the blank.

7. The blank holder and blank according to claim 1, wherein the form-fitting profile and the guide shell are configured to engage with each other when turned or pushed together.

8. The blank holder and blank according to claim 6, wherein the form-fitting profile has at least one latching lug pointing towards the guide shell, which latching lug cooperates with at least one latching recess of the guide shell, and wherein the at least one latching lug is prestressed radially inwards, or wherein the guide shell has at least one latching lug which is directed towards the form-fitting profile and interacts with at least one latching recess of the form-fitting profile, and wherein the at least one latching lug is prestressed towards the form-fitting profile.

9. The blank holder and blank according to claim 8, wherein the at least one latching lug comprises two latching lugs spaced apart from one another in the circumferential direction and act in opposite directions of rotation of the blank.

10. The blank holder and blank according to claim 1, wherein the blank with the guide shell can be detached from the form-fitting profile by turning or by pushing in the longitudinal direction of the form-fitting profile, by overcoming a latching force.

11. The blank holder and blank according to claim 8, wherein the form-fitting profile has a release device with which the at least one latching lug can be disengaged from the at least one latching recess.

12. The blank holder and blank according to claim 1, wherein the guide shell and the form-fitting profile have at least one lead-in chamfer on surfaces facing one another.

13. The blank holder and blank according to claim 1, wherein the guide shell extends over more than 15% of the circumference and less than 100% of the circumference of the blank.

14. The blank holder and blank according to claim 13, wherein the guide shell extends over less than 50% of the circumference of the blank.

15. The blank holder and blank according to claim 13, wherein the guide shell extends over 20% to 30% of the circumference of the blank.

16. The blank holder and blank according to claim 1, wherein the blank holder has, on a side opposite the blank, a machine mount with a bearing plate and a bearing journal projecting therefrom, said machine mount being designed for the automatic loading of a workpiece arm of a milling machine.

17. A method for mounting a blank on a blank holder comprising fixing a guide shell to an outer circumference of the blank before mounting, turning the blank with the guide shell into a form-fitting profile of a receiving area of the blank holder or pushing the blank in the longitudinal direction of the form-fitting profile until the blank with the guide shell engages and is fixed in a latching position against a stop.

* * * * *